United States Patent
Nomura et al.

(10) Patent No.: US 6,167,864 B1
(45) Date of Patent: Jan. 2, 2001

(54) ARRANGEMENT FOR SPARK-IGNITING DIRECT-INJECTION INTERNAL COMBUSTION ENGINE

(75) Inventors: Tadashi Nomura, Tochigi; Nobuhisa Jingu, Kanagawa, both of (JP)

(73) Assignee: Nissan Motor Co., Ltd., Yokohama (JP)

(*) Notice: Under 35 U.S.C. 154(b), the term of this patent shall be extended for 0 days.

(21) Appl. No.: 09/210,816

(22) Filed: Dec. 15, 1998

(30) Foreign Application Priority Data

Dec. 18, 1997 (JP) ...................................... 9-348766

(51) Int. Cl.$^7$ ...................................... F02B 9/10
(52) U.S. Cl. ............................. 123/298; 123/305
(58) Field of Search ...................... 123/295, 298, 123/301, 302, 305, 193.4, 193.6

(56) References Cited

U.S. PATENT DOCUMENTS

| | | | |
|---|---|---|---|
| 3,908,624 | 9/1975 | Miyake et al. | 123/32 ST |
| 4,492,194 | 1/1985 | Chmela et al. | 123/276 |
| 4,721,081 | 1/1988 | Krauja et al. | 123/298 |
| 4,958,604 | * 9/1990 | Hashimoto | 123/305 |
| 5,327,864 | 7/1994 | Regueiro | 123/260 |
| 5,642,706 | 7/1997 | Wirth et al. | 123/305 |
| 5,720,753 | * 2/1998 | Matoba et al. | 123/305 |
| 5,740,777 | * 4/1998 | Yamamoto et al. | 123/305 |
| 5,775,288 | * 7/1998 | Suzuki et al. | 123/305 |
| 5,943,993 | * 8/1999 | Carstensen et al. | 123/298 |
| 6,019,079 | * 2/2000 | Sakurahara et al. | 123/193.6 |
| 6,065,444 | 5/2000 | Jingu et al. | 123/301 |

FOREIGN PATENT DOCUMENTS

| | | |
|---|---|---|
| 0 454 117 | 10/1991 | (EP). |
| 496 029 | 7/1992 | (EP). |
| 0 558 072 | 9/1993 | (EP). |
| 62-191622 | 8/1987 | (JP). |
| 2-169834 | 6/1990 | (JP). |
| 6-101482 | 4/1994 | (JP). |
| 7-19054 | 1/1995 | (JP). |
| 9-79081 | 3/1997 | (JP). |

* cited by examiner

Primary Examiner—Erick Solis
(74) Attorney, Agent, or Firm—Foley & Lardner (57) ABSTRACT

In an arrangement for a spark-igniting direct-injection internal combustion engine, a division of X by B (X/B) (B denotes a cylinder bore diameter of each cylinder and X denotes a distance from a fuel injection nozzle up to a center axial line of the corresponding cylinder) ranges from 0.38 to 0.46. A division of Y by B (Y/B) ranges from 0.4 to 0.5 (wherein Y denotes a distance from a line passing through a spark-ignition portion of a spark plug up to an injection nozzle of the fuel injection valve. A division of Z by B (Z/B) ranges from 0.2 to 0.3 (wherein Z denotes a distance from the nozzle of the fuel injection valve up to a center of the intake valve).

5 Claims, 6 Drawing Sheets

SECT A-A

VIEWED FROM DIRECTION OF A

SECT B-B

FIG.3C

SECT A-A

FIG.4

‹STRATIFIED COMBUSTION›

FIG.5

‹HOMOGENEOUS COMBUSTION›

ARRANGEMENT FOR SPARK-IGNITING DIRECT-INJECTION INTERNAL COMBUSTION ENGINE

BACKGROUND OF THE INVENTION a) Field of the Invention

The present invention relates to an arrangement for a spark-igniting direct-injection internal combustion engine and, more particularly, relates to a technical improvement in a lay-out of a fuel combustion/injection system in the spark-igniting direct-injection internal combustion engine (including a spark plug, a fuel injection valve, an intake port(s), an intake valve(s), and a piston cavity).

b) Description of the Related Art

Each of two Japanese Patent Application First Publications No. Showa 62-191622 published on Aug. 22, 1987, Heisei 2-169834 published on Jun. 29, 1990, exemplifies an internal combustion engine (so-called, a spark-igniting direct-injection internal combustion engine) in which a given amount of fuel is uninterruptedly or directly injected into a combustion chamber of each engine cylinder and the given amount of fuel is normally injected during a suction stroke of each corresponding cylinder to perform a combustion of injected fuel (homogeneous combustion) with a homogeneous air mixture fuel (a state in which the injected fuel is dispersed uniformly within a whole combustion chamber).

In addition, when the engine falls in a predetermined driving condition (for example, in a state where an engine speed is low and an engine load is low), the fuel is injected during a compression stroke of the corresponding cylinder to form a stratified air mixture fuel having a first layer including the air mixture fuel of a combustible air mixture fuel within the combustion chamber and ignitable by means of a corresponding spark plug and a second layer having the combustible air mixture fuel receiving a combustion flame from the first layer although the ignition through an aerial layer including EGR (Exhaust Gas Recirculation) or the corresponding spark plug is difficult.

Hence, it becomes possible to perform a combustion (stratified combustion) at an extremely thin air-fuel mixture ratio (air-fuel mixture ratio (an air fuel mixture ratio placed in a vicinity to a lean limit) so that an improvement in a fuel consumption due to a reduction in a pumping loss has been made.

On the other hand, each of three Japanese Patent Application First Publications No. Heisei 6-101482 published on Apr. 12, 1994, No. Heisei 7-19054 published on Jan. 20, 1995, and No. Heisei 9-79081 published on Mar. 25, 1997 exemplifies a previously proposed system lay-out of a fuel combustion/injection system (the fuel combustion/injection system includes the spark plug, the fuel injection valve, the intake port, and the piston cavity of the engine) of the spark-igniting direct-injection internal combustion engine.

SUMMARY OF THE INVENTION

However, in each of the above-described Japanese Patent Application First Publications, no detailed discussion on the system lay-out of the fuel combustion/injection system of the spark-igniting direct-injection internal combustion engine is taken into consideration, the spark-igniting direct-injection internal combustion engine being arranged so that the intake port such that an intake air is introduced through a side surface of a cylinder head and the introduced intake air is further introduced into the corresponding combustion chamber from an upper surface of the combustion chamber located so as to face toward a lower surface of the cylinder head is provided and an injection nozzle of the fuel injection valve is disposed on a peripheral edge portion of the combustion chamber rather than an opening end portion of the corresponding combustion chamber of the intake port.

It is necessary to design the system lay-out of the fuel combustion/injection system with a difference in a combustion mode taken into consideration so that both of a combustion characteristic and an engine driveability in both combustion modes of homogeneous combustion and stratified combustion can be satisfied since the combustion modes in the homogeneous combustion and the stratified combustion are different when the engine is driven with the homogeneous combustion and stratified combustion switched.

It is, thus, an object of the present invention to provide an optimum system lay-out of the fuel combustion/injection system in the spark-igniting direct-injection internal combustion engine as an optimum arrangement for the spark-igniting direct-injection internal combustion engine in which the intake port such that an intake air is introduced through the side surface of the cylinder head and the introduced intake air is further introduced into the corresponding combustion chamber from the upper surface of the combustion chamber located so as to face toward the lower surface of the cylinder head is provided and the injection nozzle of the fuel injection valve is disposed on a peripheral edge portion of the combustion chamber rather than an opening end portion of the corresponding combustion chamber of the intake port.

According to one aspect of the present invention, there is provided with a spark-igniting direct-injection internal combustion engine, comprising: at least one cylinder having a bore diameter B; and a fuel injection valve disposed on a peripheral edge of a closed end of the cylinder and including an injection nozzle faced toward an inner part of the cylinder and through which a given amount of fuel is injected into the inner part of the cylinder, and wherein X/B ranges from 0.38 to 0.46, wherein X denotes a distance from the injection nozzle of the fuel injection valve up to a center axial line of the cylinder.

According to another aspect of the present invention, there is provided with a spark-igniting direct-injection internal combustion engine, comprising: at least one cylinder having a bore diameter B; a spark plug installed on a predetermined part of a closed end of the cylinder; and a fuel injection valve disposed on a peripheral edge of the closed end of the cylinder and including an injection nozzle faced toward an inner part of the cylinder and through which a given amount of fuel is injected into the inner part of the cylinder, and wherein Y/B ranges from 0.4 to 0.5, wherein Y denotes a distance from a line passing through a spark-ignition portion of the ignition plug and which is parallel to a center axial line of the cylinder up to the injection nozzle of the fuel injection valve.

According to a still another aspect of the present invention, there is provided with a spark-igniting direct-injection internal combustion engine, comprising: at least one cylinder having a bore diameter B; at least one intake valve disposed on a predetermined part of the closed end of the cylinder; and a fuel injection valve disposed on a peripheral edge of the closed end of the cylinder and including an injection nozzle faced toward an inner part of the cylinder and through which a given amount of fuel is injected into the inner part of the cylinder, and wherein Z/B ranges from 0.2 to 0.3, wherein Z denotes a distance from the nozzle up to a center of the intake valve.

This summary of the invention does not necessarily describe all necessary features so that the invention may also be a sub-combination of these described features.

BEST MODE FOR CARRYING OUT THE INVENTION:

Reference will hereinafter be made to the drawings in order to facilitate a better understanding of the present invention.

Figure 1:
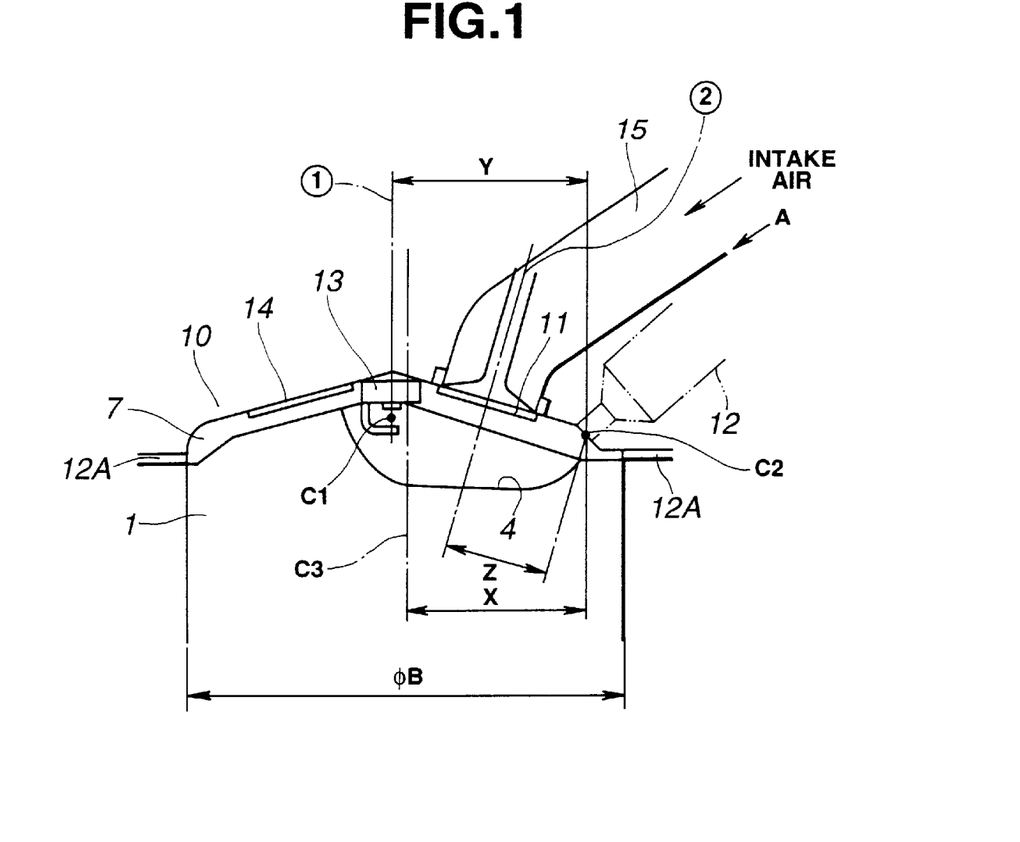
FIG. 1 is a longitudinal cross sectional view of a cylinder head and a cylinder piston related to a preferred embodiment of an arrangement for a spark-igniting direct-injection internal combustion engine according to the present invention.

FIG. 1 shows a longitudinally cross sectional view of a cylinder head and a piston in a preferred embodiment of an arrangement for a spark-igniting direct-injection internal combustion engine according to the present invention.

Figure 2:
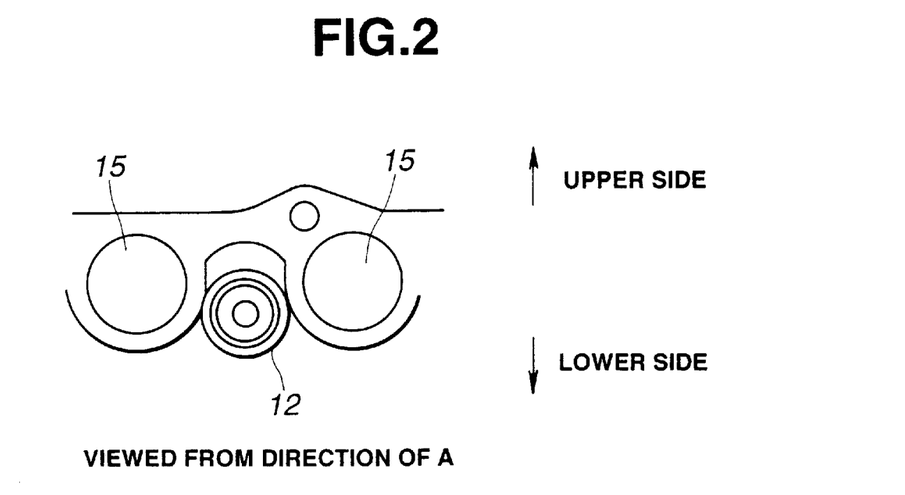
FIG. 2 is an explanatory arrow-marked directional view from A in FIG. 1 for explaining a lay-out of a pair of intake ports and a fuel injection valve in the preferred embodiment of the arrangement for the spark-igniting direct-injection internal combustion engine.

FIG. 2 shows a schematic view of arrangements of a pair of intake ports and a fuel injection valve (also called, a fuel injector) viewed from an arrow-marked direction of A in FIG. 1.

Figure 3A:
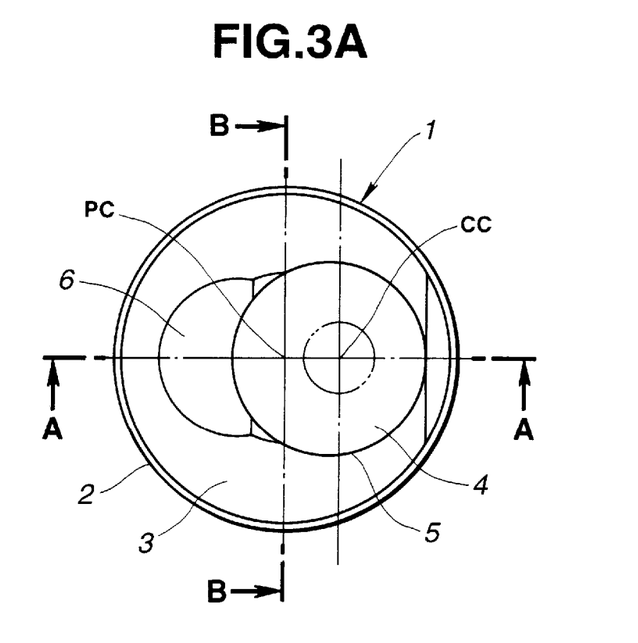
FIG. 3A is a top view of a piston installed within a representative cylinder in the preferred embodiment shown in FIG. 1.
Figure 3B:
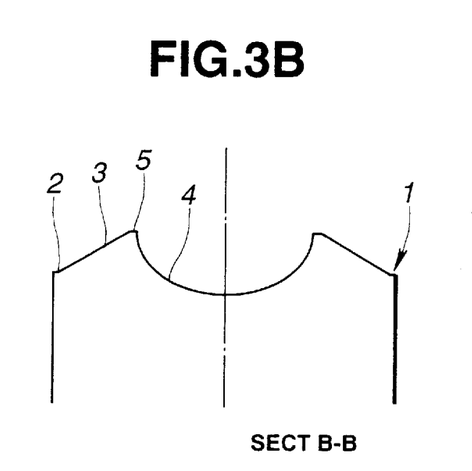
FIG. 3B is a side cross sectional view of the piston cut away along a line of B—B in FIG. 3A.
Figure 3C:
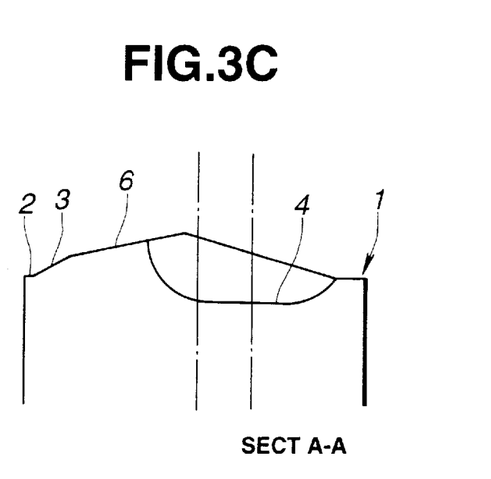
FIG. 3C is a side cross sectional view of the piston cut away along a line of A—A in FIG. 3A.

FIGS. 3A, 3B, and 3C integrally show a detailed profile of the piston shown in FIG. 1.

A crown surface of the piston 1 includes, for example, as shown in FIGS. 3A through 3C, a reference plane 2 in a circular form located at an outermost peripheral surface thereof; a slanted surface 3 by which the crown surface of the piston 1 is convex shaped in an approximately truncated cone shape; and a cavity 4 in a recessed disc-shaped form located on the concaved part of the slanted surface 3 with a position CC of the cavity 4 offset from a center axial line PC of the piston 1 toward an intake valve as a center.

In details, the slanted surface 3 is formed as a continuously lowered surface which is located on an outer peripheral side of a ridge line 5 enclosing the cavity 4.

This slanted surface 3 is formed in a single truncated cone surface.

In addition, another slanted surface 6 more moderately than the slanted surface 3 is formed on an outer peripheral side of the ridge line 5 of a peripheral edge located on a piston center of the cavity 4 so that a height of a maximum portion of the piston 1 can be suppressed.

It is noted that a pair of intake ports 15 are formed in association with each combustion chamber 7 (cylinder) on a cylinder head 10, an intake valve 11 being attached onto an opening end of each intake port 15 faced against the corresponding combustion chamber 7.

It is also noted that, for example, a pair of exhaust ports (not shown) are formed in association with each combustion chamber 7 (cylinder) on the cylinder head, an exhaust valve 14 being attached onto an opening end of each exhaust port faced against the corresponding combustion chamber 7. It is noted that a single exhaust port may be formed in place of the pair of exhaust ports.

The pair of intake ports 15 are arranged so that the intake air is introduced from a side of the cylinder head 10 (for example, from a, so-called, thrust direction or an anti-thrust direction) into the combustion chamber 7 located so as to face toward a lower surface of the cylinder head 10 through an upper surface of the combustion chamber 7.

As shown in FIG. 1, the fuel injection valve 12 is disposed on the cylinder head 10 so that the fuel injected from a position of the intake valves 11 into the cavity 4 is advanced and a spark plug 13 is disposed on an upper portion of an inner side of a peripheral edge located on the cavity 4 faced toward a piston center axial line.

The fuel injection valve 12 is disposed, for example, as shown in FIG. 2, on a portion of the cylinder head 10 located below a common connection line between the pair of intake ports 15, 15 and which is orthogonal to each center axial line of the pair of intake ports 15, 15, in other words, is disposed on a peripheral edge portion of the combustion chamber 7, as shown in FIG. 1.

A fuel injection timing at which the fuel injection valve 12 is injected is set at a suction stroke of the corresponding cylinder in the case of the homogeneous combustion mode and is set at a compression stroke thereof in the case of the stratified combustion mode.

It is necessary to consider the lay-out of the fuel combustion/injection system in the engine with the difference in the combustion mode taken into consideration so that the engine driving characteristics in the respective combustion modes can compatibly be satisfied to each other since the combustion mode is different between the homogeneous combustion and the stratified combustion in a case where the engine is driven with the combustion mode switched between the homogeneous combustion and the stratified combustion.

Hence, various types of experiments and simulations were repeatedly carried out. As results of these experiments and simulations, the following optimum values were obtained for X, Y, and Z shown in FIG. 1.

It is noted that X denotes a shortest (straight line) distance from a center axial line of a cylinder bore up to a nozzle center of the fuel injection valve 12 (unit is, e.g., mm), Y denotes a shortest distance from an axial line ① passing through a spark gap C1 of the spark plug 13 and which is parallel to an axial line of a cylinder bore center C3 up to a nozzle center C2 of the fuel injection valve 12 (unit is, e.g., mm), and Z denotes a shortest distance from a center axial line ② of the corresponding one 11 of the pair of intake valves up to the nozzle center of the fuel injection valve 12 (unit is, e.g., mm).

It is noted that the cylinder bore is denoted by B in mm) and 12A in FIG. 1 denotes a gasket.

Figure 4:
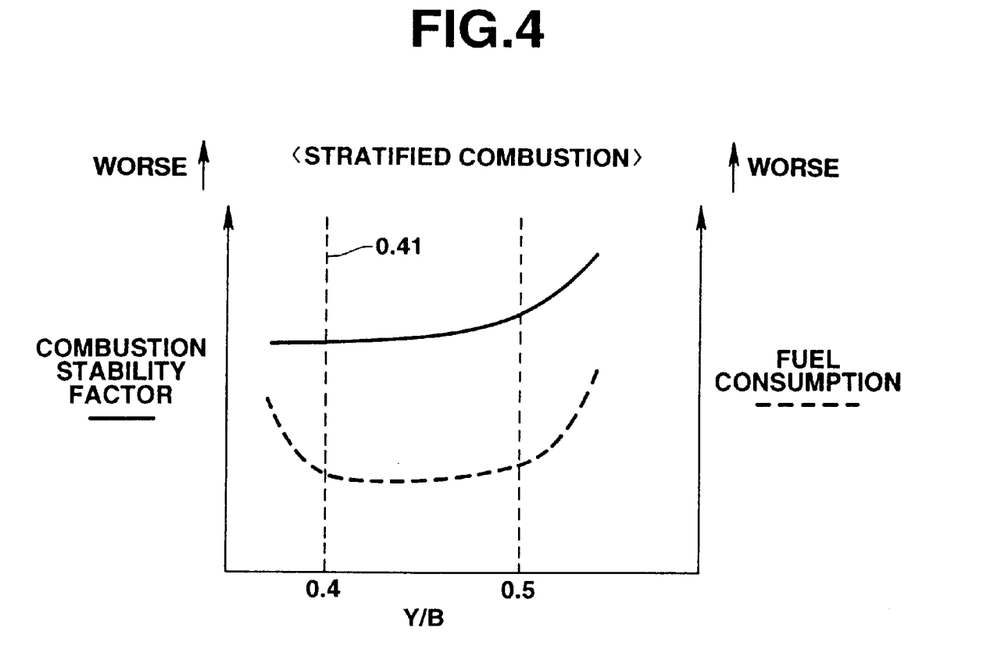
FIG. 4 is a characteristic graph representing variations in a fuel consumption and in a combustion stability factor with respect to Y/B during a stratified combustion mode in the preferred embodiment shown in FIG. 1.

That is to say, as appreciated from FIG. 4, during the stratified combustion mode (when the fuel is injected during the compression stroke), the fuel consumption becomes worse when Y/B<0.41 (It is noted that B denotes the cylinder bore diameter in a unit of mm and by Y/B, Y is non-dimensionalized (the value of Y becomes dimensionless) so that Y/B can be applied to every engine having the bore diameter).

That is to say, if Y/B<0.41, before the fuel injected from the fuel injection valve 12 is favorably atomized, the injected fuel reaches to the spark plug 13. Hence, fuel droplets are excessively concentrated on a surrounding of the spark plug 13.

Figure 6A:
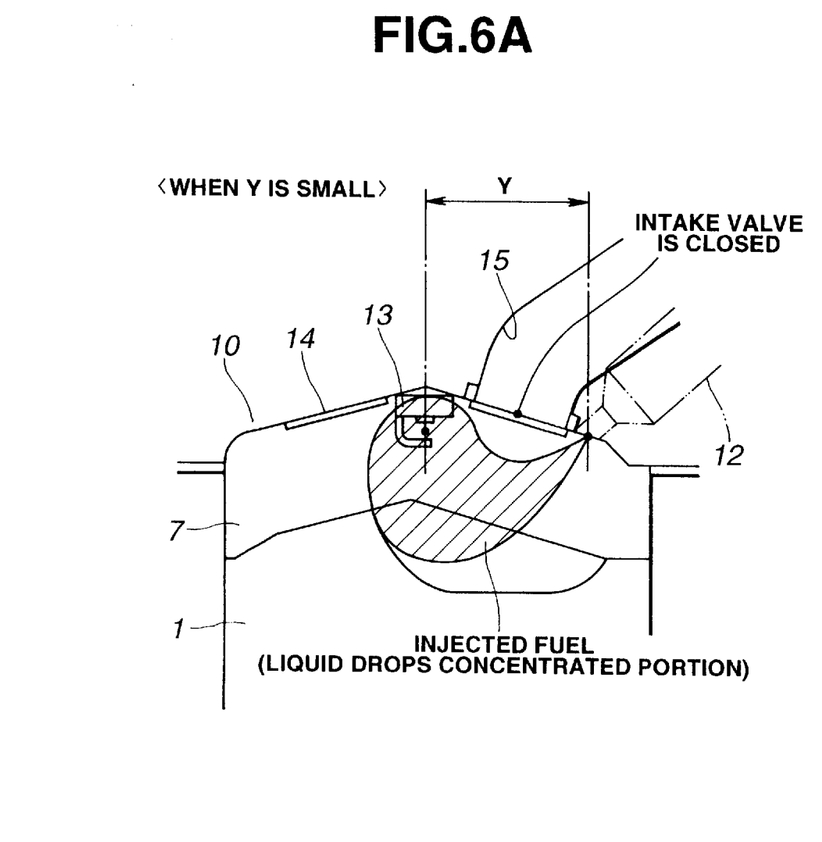
FIGS. 6A and 6B are explanatory cross sectional views of a representative cylinder head for explaining a difference in combustion characteristics according to different magnitudes of Y/B (when Y is small and when Y is large) during the stratified combustion related to the preferred embodiment.

Since, in this state, a fresh air cannot be introduced into the surrounding of the fuel droplets and the combustion becomes inactivated, the non-combusted fuel is increased. Therefore, HC concentration, flue gas concentration, and fuel consumption are worsened as appreciated from FIG. 6A.

On the other hand, if Y/B>0.5, both combustion stability and fuel consumption are worsened as appreciated from FIG. 4.

In details, if Y/B>0.5, after the fuel injected from the fuel injection valve 12 is atomized more than requirement, the injected fuel is reached to the spark plug 13. Hence, the fuel is too be dispersed over the combustion chamber.

Hence, since the ignitable air-fuel mixture cannot favorably be transported to the spark plug 13, an ignitability is worsened so that the combustion stability and driveability can be worsened.

Figure 6B:
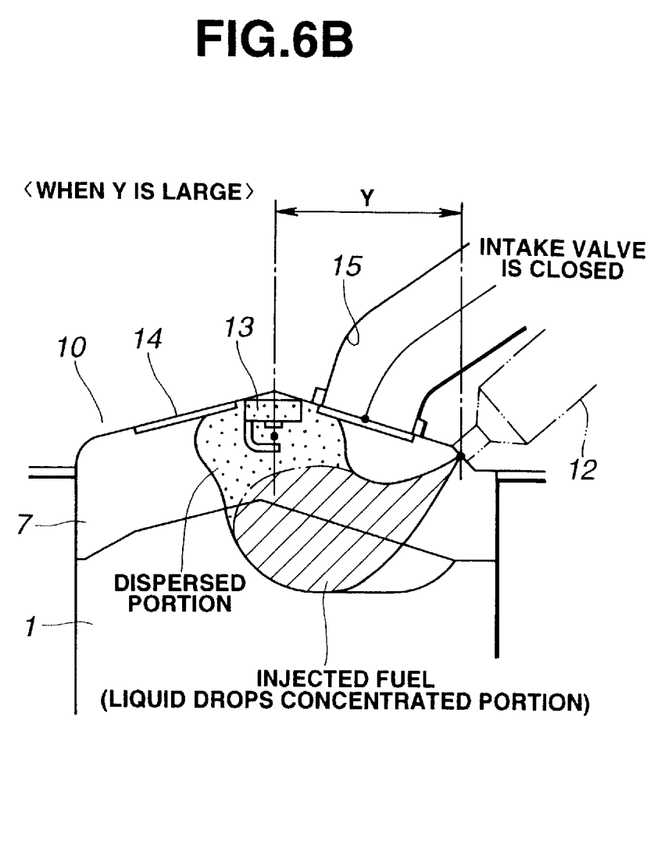

Since the non-combusted fuel is increased, both HC concentration and fuel consumption can be worsened as appreciated from FIG. 6.

Hence, it was confirmed that Y/B was preferably set to a range from 0.41 to 0.50.

Figure 5:
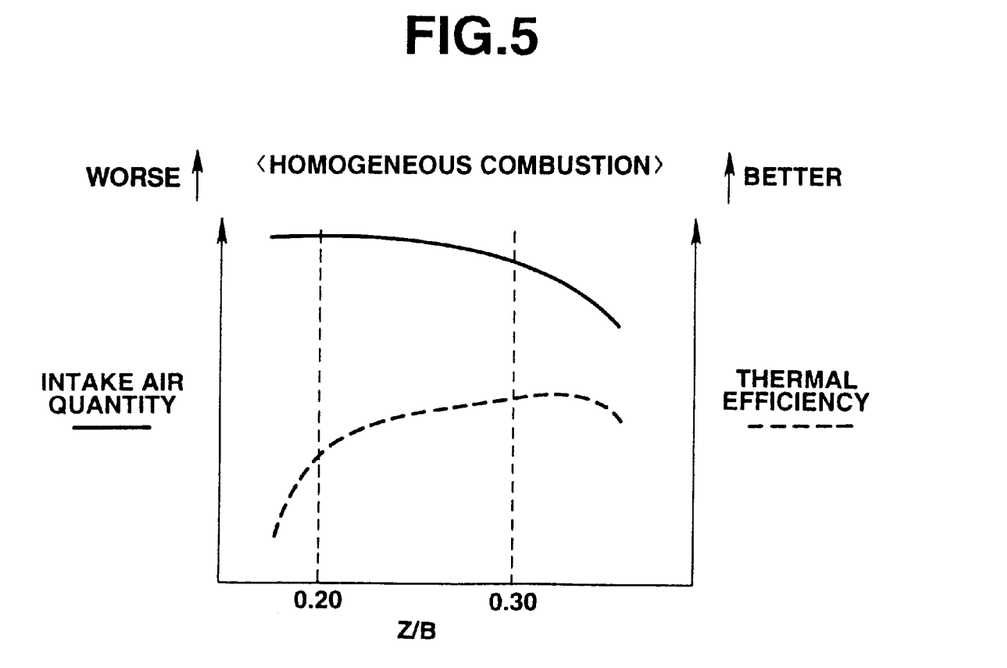
FIG. 5 is a characteristic graph representing variations in a thermal efficiency and an intake air quantity with respect to Z/B during a homogeneous combustion mode in the preferred embodiment shown in FIG. 1.

In addition, as appreciated from FIG. 5, a thermal efficiency is reduced if Z/B<0.2 (It is noted that B denotes a cylinder bore diameter in mm and by Z/B, Z is non-dimensionalized (the value of Z becomes dimensionless) so that Z/B can be applied to every engine having the bore diameter).

Figure 7A:
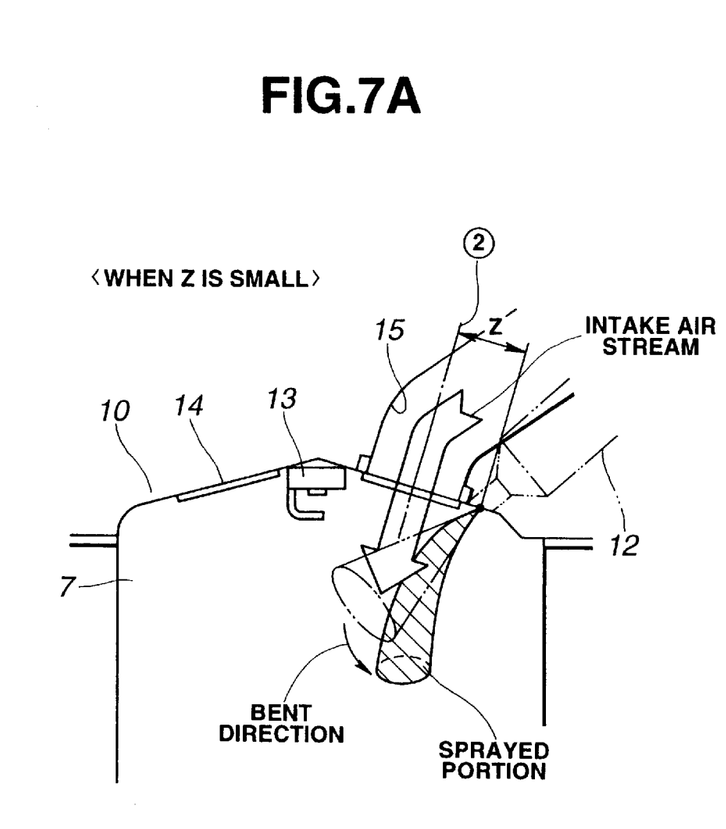
FIGS. 7A and 7B are explanatory cross sectional views of the representative cylinder head for explaining a difference in the combustion characteristics according to different magnitudes of Z/B when Z is small and when Z is large during a homogeneous combustion related to the preferred embodiment shown in FIG. 1.

That is to say, if Z/B<0.2, the fuel injected immediately after the fuel injection is carried out via the fuel injection valve 13 is bent in a downward direction due to a stream of intake air (as appreciated from FIG. 7A, since the stream of intake air is impeded from the injected fuel coming into a favorable collision with the stream of intake air so as to promote a vaporization of the fuel).

On the other hand, if Z/B>0.3, the distance between the injected fuel and the stream of intake air is too be separated (far away) from each other and a possibility of the collision of the injected fuel with the stream of intake air is reduced so that the vaporization is not promoted and an intake air cooling effect due to a latent heat when the vaporization is carried out is reduced.

Figure 7B:
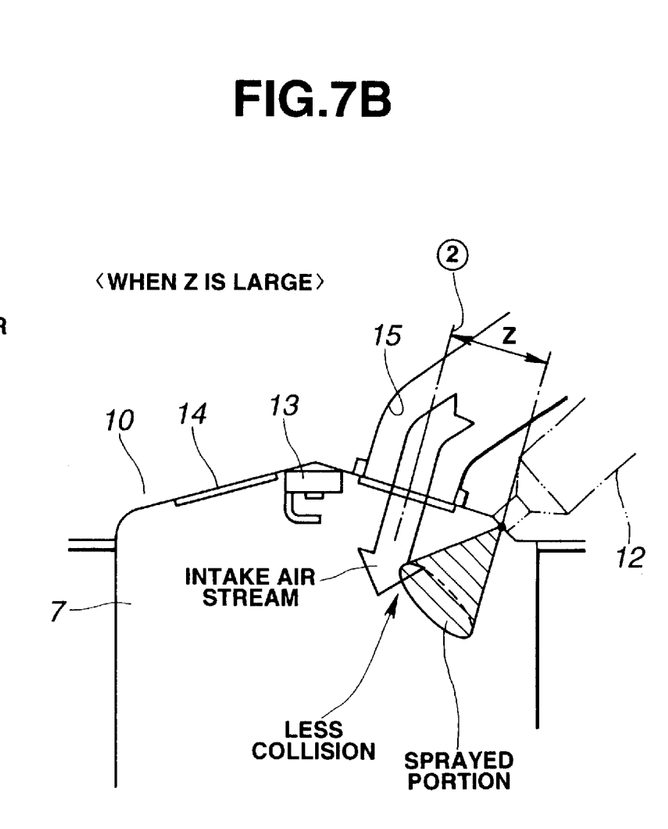

Hence, as appreciated from FIG. 7B, either an intake air charging efficiency or volumetric efficiency is reduced so that the intake air quantity and engine output power are accordingly reduced.

Consequently, it is preferable that Z/B is set in a range from 0.20 to 0.30.

Even if both Y and Z are set to their appropriate values, a swirl can effectively be utilized unless X is, in nature, set to its appropriate value and the advantageous effects cannot be achieved due to the setting of Y and Z at their appropriate values.

Figure 8:
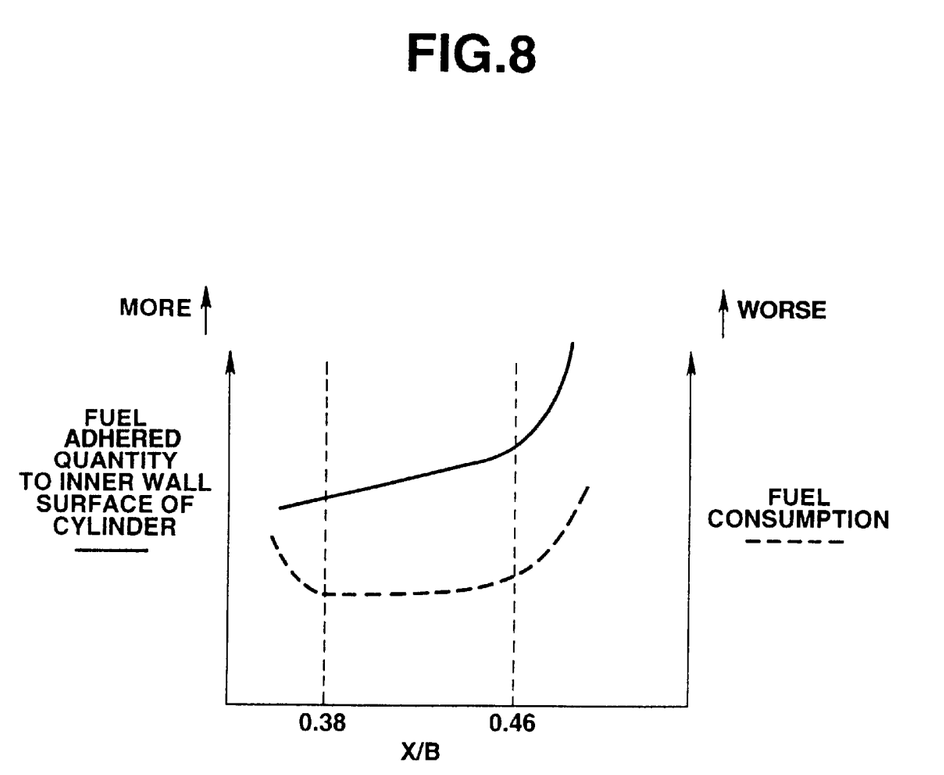
FIG. 8 is a characteristic graph for explaining variations in the fuel consumption and adhesion quantity of fuel onto an inner peripheral wall of the representative cylinder according to the magnitude of X/B related to the preferred embodiment shown in FIG. 1.

Therefore, as appreciated from FIG. 8, the value of X/B ranges preferably from 0.38 to 0.46 (It is noted that B denotes the cylinder bore (diameter) in mm and X in X/B is non-dimensionalized (the value of X becomes dimensionless) so as to enable an application thereof to every engine having the cylinder bore).

In details, if X/B<0.38, since the injection nozzle of the fuel injection valve (fuel injector) 12 is excessively near to the center of the cylinder bore, a part of the swirl whose stream velocity is faster than another part thereof can effectively be utilized (the swirl stream velocity becomes faster as the distance of the swirl to the cylinder center becomes large), the combustion becomes inactive so that the HC (hydrocarbon) concentration, the flue gas concentration, and the fuel consumption are worsened.

On the other hand, if X/B>0.46, the injection nozzle (hole) of the fuel injection valve 12 is excessively near to an inner peripheral wall of the cylinder so that a fuel adhesion quantity to a cylinder inner peripheral wall surface becomes increased and, so-called, an over-swirl (a phenomenon such that the fuel is excessively dispersed and a phenomenon such that a flame propagation cannot be made and a flame is blown out by the swirl) occurs so that the combustion is, in turn, worsened and HC concentration, flue gas concentration, and the fuel consumption are worsened.

Furthermore, even if the values of X, Y, and Z are set to the other appropriate values, it is preferable that the cavity 4 is formed so that the main stream component of the injected fuel from the fuel injection valve 12 is caused to be introduced into an inner side of the cavity 4 at least without the collision of a main stream component of the injected fuel from the injection valve 12 against the crown surface portion of the piston 2 and the main stream component of the injected fuel from the fuel injection valve 12 is caused to be introduced into an inner side of the cavity 4 and the spark gap portion (C1) of the spark plug 13 is not located outside the cavity 4.

In the way described above, a transport of fuel to a space adjacent to the spark plug 13 during the stratified combustion (during the injection of fuel at the compression stroke of the cylinder) can favorably be carried out so that the ignitability and combustion stability can be improved.

In the preferred embodiment, the combustion characteristic during the stratified combustion mode can be improved when Y (or Y/B) is set to its optimum value. The combustion characteristic during the homogeneous combustion mode can be improved when Z (or Z/B) is set to its optimum value.

If Y (or Y/B) and Z (or Z/B) are set to their optimum values, both of the combustion characteristic and the driveability in both combustion modes can be satisfied (compatible) to each other even if the engine is driven with the combustion mode switched between the homogeneous combustion and the stratified combustion.

In addition, since X (or X/B) is set to its optimum value so that the swirl can effectively be utilized and the adhesion quantity of fuel onto the cylinder wall surface can be reduced, the optimum value of X (or X/B) can improve not only the fundamental performance that the engine has (the combustion characteristic, fuel consumption, oil dilution, and scuffing characteristic between the piston ring and cylinder) but also can exhibit more effectively the advantage generated due to the set of the optimum value of Z (or Z/B).

Furthermore, in the case where the cavity 4 is formed in the crown surface of the piston 1 as in the preferred embodiment, the spark gap (spark-ignition portion) of the spark plug 13 is exposed toward the outer peripheral part or toward the inner side of the cavity 4 and the fuel injection direction of the fuel injection valve 12 is set toward the position of the cavity 4 at the fuel injection timing during the stratified combustion mode. Hence, the main stream component of the injected fuel from the fuel injection valve 12 can be introduced into the inner side of the cavity 4 at least without the collision of the main stream component against the crown surface of the piston 1 and the cavity 4 is formed so that the ignition gap portion of the spark plug 13 is not located outside of the cavity 4. Consequently, the transport of fuel to the space placed adjacent to the spark plug 13 during the stratified combustion mode (during the injection of fuel at the compression stroke of the cylinder) can more favorably be carried out.

It becomes possible to improve furthermore the ignitability and combustion stability and the advantage of setting Y (or Y/B) and E (or Z/B) to their optimum values can more effectively be exhibited.

In the preferred embodiment, the pair of intake ports 15 and 15 are provided per cylinder.

However, the present invention is applicable to the engine having a single intake port for each cylinder or applicable to the engine having three or more intake ports for each cylinder.

It is noted that the cylinder head means the closed end of the engine cylinder and is placed on a predetermined upper part of the cylinder which is opposite to the piston of the cylinder and the bore diameter means the interior diameter of the engine cylinder.

What is claimed is:

1. The spark ignition direct injection internal combustion engine comprising:

a cylinder including an intake port and an exhaust port, the intake port and the exhaust port being offset from a center axial line of the cylinder in opposite directions; and a piston moveable within that cylinder, the piston having a crown surface with a peripheral outermost circle edge thereof defining a reference plane;

wherein the piston crown surface includes
a first slanted surface, slanted relative to the reference plane, the first slanted surface formed as a single truncated cone surface, and
a concave recessed disk shaped part defining a cavity which is offset from a center axial line of the piston toward the intake port, and wherein the piston crown surface further includes a second slanted surface formed from a ridge line of the cavity offset from the center axial line of the piston toward the exhaust port, the second slanted surface being more moderately slanted, relative to the reference plane, than the first slanted surface.

2. The spark ignition direct injection internal combustion engine according to claim 1, further including an intake valve disposed on a predetermined part of the closed end of the cylinder, wherein a ratio Z/B ranges from 0.2 to 0.3, wherein Z denotes a distance from the injection nozzle up to a center of the intake valve, and B denotes a bore diameter of the cylinder.

3. The spark ignition direct injection internal combustion engine according to claim 2, further including a fuel injection valve disposed on a periperal edge of a closed end of the cylinder and having an injection nozzle facing an inner part of the cylinder, and wherein a ratio X/B ranges from 0.38 to 0.46, wherein X denotes a distance from the injection nozzle of the fuel injection valve up to the center axial line of the cylinder.

4. The spark ignition direct injection combustion engine according to claim 2, further including a spark plug installed on a predetermined part of the closed end of the cylinder, wherein a ratio Y/B ranges from 0.4 to 0.5, wherein Y denotes a distance from a line passing from a spark ignition portion of the sparkplug and which is parallel to a center axial line of the cylinder up to the injection nozzle of the fuel injection valve.

5. The spark ignition direct injection internal combustion engine according to claim 2, further including a fuel injection valve disposed on a peripheral edge of a closed end of the cylinder and having an injection nozzle facing an inner part of the cylinder, and a spark plug installed on a predetermined part of the closed end of the cylinder, wherein a ratio X/B ranges from 0.38 to 0.46, wherein X denotes a distance from the injection nozzle of the fuel injection valve up to the center axial line of the cylinder, and wherein a ratio Y/B ranges from 0.4 to 0.5, wherein Y denotes a distance from a line passing from a spark ignition portion of the sparkplug and which is parallel to a center axial line of the cylinder up to the injection nozzle of the fuel injection valve.

* * * * *